United States Patent
Abdo et al.

(10) Patent No.: US 7,203,685 B2
(45) Date of Patent: Apr. 10, 2007

(54) APPARATUS AND METHOD FOR ESTIMATING CARDINALITY WHEN DATA SKEW IS PRESENT

(75) Inventors: Abdo Esmail Abdo, Rochester, MN (US); Michael S. Faunce, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 462 days.

(21) Appl. No.: 10/733,959

(22) Filed: Dec. 11, 2003

(65) Prior Publication Data

US 2005/0131914 A1    Jun. 16, 2005

(51) Int. Cl.
*G06F 7/00*    (2006.01)

(52) U.S. Cl. ............................. 707/100; 707/2

(58) Field of Classification Search .................. 707/2, 707/100
See application file for complete search history.

(56) References Cited

U.S. PATENT DOCUMENTS

| | | | |
|---|---|---|---|
| 6,732,085 B1* | 5/2004 | Mozes | 707/2 |
| 2002/0198867 A1* | 12/2002 | Lohman et al. | 707/3 |
| 2004/0059743 A1* | 3/2004 | Burger | 707/101 |

* cited by examiner

*Primary Examiner*—Don Wong
*Assistant Examiner*—Michael Le
(74) *Attorney, Agent, or Firm*—Martin & Associates, LLC; Derek P. Martin (57) ABSTRACT

A cardinality estimator computes an estimated cardinality for a database column using a formula that accounts for skew in the data in the column. The result is an estimate of cardinality that more closely resembles the actual cardinality in the column. The improved cardinality estimate may then be used to make better query optimizations.

9 Claims, 7 Drawing Sheets

$$Ca' = P + M(1-(1-1/M)^Y)$$

where $$M = Ca - (P+Q)$$

$$Y = X - Fi$$

X = number of rows in intermediate dataset
P = number of distinct skewed values in X
Q = number of distinct skewed values not in X
Fi = sum of frequencies for all skewed values in X above predetermined threshold

FIG. 1

Select count(*) from T where T.A < b group by T.A

FIG. 2

Table T

|  | Col. A | Col. B | ⋯ | Col. H |
|---|---|---|---|---|
| Row 1 |  |  |  |  |
| Row 2 |  |  |  |  |
| ⋮ |  |  |  |  |
| Row G |  |  |  |  |

FIG. 3

Assumption: Cardinality of T.A is Ca

Query Optimizer Needs to Estimate Ca' (cardinality of T.A after applying local selection)

FIG. 4

Ca' = min(Ca,X)

FIG. 5  Prior Art $$Ca' = Ca(1-(1-1/Ca)^X)$$
where
X = Number of Rows in Intermediate Dataset

FIG. 8  Prior Art $$Ca' = P + M(1-(1-1/M)^Y)$$
where
$$M = Ca - (P+Q)$$
$$Y = X - Fi$$
X = number of rows in intermediate dataset
P = number of distinct skewed values in X
Q = number of distinct skewed values not in X
Fi = sum of frequencies for all skewed values
in X above predetermined threshold

Total Records = 1,000,000
Cardinality = 100,000

FIG. 12

Select count(*) from T where T.A > "F"

FIG. 13

Frequent Values List 1400

| Value | Freq. |
|---|---|
| Smith | 150,000 |
| Jones | 100,000 |
| Anderson | 75,000 |
|  |  |
|  |  |

$$Ca' = \min(100{,}000,\ 333{,}000)$$
$$= 100{,}000$$

APPARATUS AND METHOD FOR ESTIMATING CARDINALITY WHEN DATA SKEW IS PRESENT

BACKGROUND OF THE INVENTION

1. Technical Field

This invention generally relates to computer systems, and more specifically relates to apparatus and methods for optimizing a database query when data skew is present.

2. Background Art

Since the dawn of the computer age, computers have evolved and become more and more powerful. In our present day, computers have become indispensable in many fields of human endeavor including engineering design, machine and process control, information storage and retrieval, and office computing. One of the primary uses of computers is for information storage and retrieval.

Database systems have been developed that allow a computer to store a large amount of information in a way that allows a user to search for and retrieve specific information in the database. For example, an insurance company may have a database that includes all of its policy holders and their current account information, including payment history, premium amount, policy number, policy type, exclusions to coverage, etc. A database system allows the insurance company to retrieve the account information for a single policy holder among the thousands and perhaps millions of policy holders in its database.

Retrieval of information from a database is typically done using queries. A query usually specifies conditions that apply to one or more columns of the database, and may specify relatively complex logical operations on multiple columns. The database is searched for records that satisfy the query, and those records are returned as the query result.

Queries that are frequently run may be optimized to enhance system performance. In one example of query optimization, an intermediate dataset is constructed that may satisfy frequently-executed queries. In order to determine when and how to construct an intermediate dataset, the query optimizer must be able to estimate the number of distinct values, i.e., the cardinality, in a column. This estimate may then be used by the query optimizer to determine how to build the intermediate dataset.

Various methods have been developed to estimate the number of distinct values in a column. However, the prior art assumes an even distribution of data. Thus, if a column has 100,000 records, and there are 10,000 distinct values in those 100,000 records, the prior art assumes that each distinct value has 10 records. Note, however, that in some circumstances the data in a database table may be skewed. Data skew occurs when a small number of distinct values represent a relatively large number of records in the table. For example, a column of last names would have an abnormally high occurrence of common last names like "Smith", "Jones" or "Anderson", while having an abnormally low occurrence of less common last names like "Abdo" or "Faunce". When data skew is present, the prior art estimate of distinct values is incorrect, and results in optimizations that are based on incorrect information. Without a way to estimate cardinality in a manner that accounts for data skew, the computer industry will continue to suffer from inaccurate estimates of cardinality due to data skew when performing query optimizations.

DISCLOSURE OF INVENTION

According to the preferred embodiments, a cardinality estimator computes an estimated cardinality for a database column using a formula that accounts for skew in the data in the column. The result is an estimate of cardinality that more closely resembles the actual cardinality in the column. The improved cardinality estimate may then be used to make better query optimizations.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

1.0 Overview

The present invention relates to estimating cardinality of an intermediate dataset to allow optimizing database queries. For those not familiar with databases or queries, this Overview section will provide background information that will help to understand the present invention.

Known Databases and Database Queries

There are many different types of databases known in the art. The most common is known as a relational database (RDB), which organizes data in tables that have rows that represent individual entries or records in the database, and columns that define what is stored in each entry or record.

To be useful, the data stored in databases must be able to be efficiently retrieved. The most common way to retrieve data from a database is to generate a database query. A database query is an expression that is evaluated by a database manager. The expression may contain one or more predicate expressions that are used to retrieve data from a database. For example, lets assume there is a database for a company that includes a table of employees, with columns in the table that represent the employee's name, address, phone number, gender, and salary. With data stored in this format, a query could be formulated that would retrieve the records for all female employees that have a salary greater than $40,000. Similarly, a query could be formulated that would retrieve the records for all employees that have a particular area code or telephone prefix.

Figure 2:
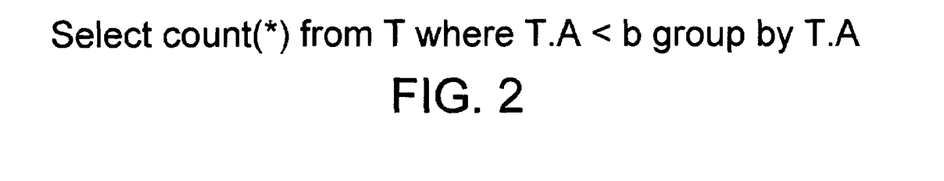
FIG. 2 shows a sample database query in Structured Query Language (SQL)

One popular way to define a query uses Structured Query Language (SQL). SQL defines a syntax for generating and processing queries that is independent of the actual structure and format of the database. One sample SQL query is shown in FIG. 2. The "select count(*)" statement tells the database query processor to count (or aggregate) the result, the "from T" statement identifies which database table to search, and the "where" clause specifies one or more expressions that must be satisfied for a record to be included in the resulting dataset. Note that the query of FIG. 2 is expressed in terms of column T.A. Information about the internal storage of the data is not required as long as the query is written in terms of expressions that relate to values in columns from tables.

Figure 3:
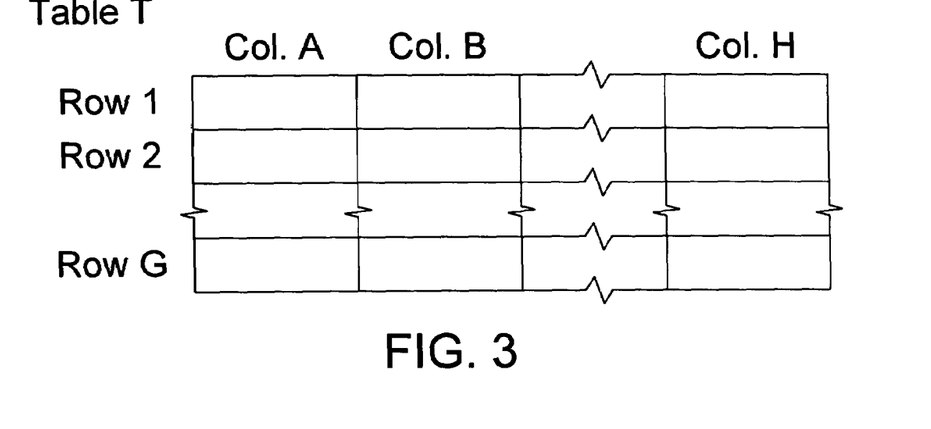
FIG. 3 shows a sample database table for the query in FIG. 2.

A sample table T is shown in FIG. 3. Table T is a suitable table that the query of FIG. 2 could be run against. Table T includes multiple rows 1–G, and multiple columns A–H. For the query of FIG. 2 and the table T of FIG. 3, we make the assumption in FIG. 4, namely the cardinality of column T.A is Ca.

Figure 4:
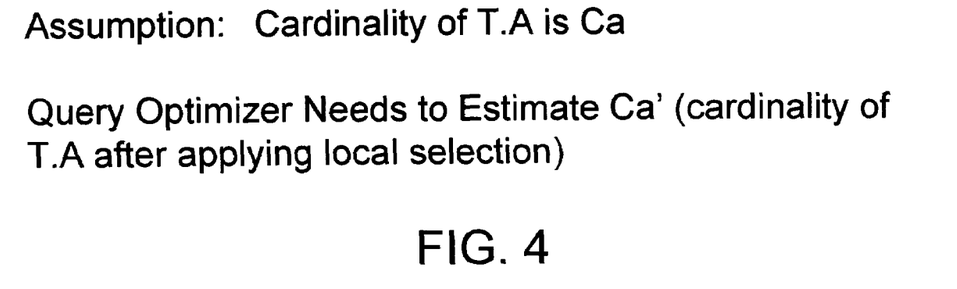
FIG. 4 shows assumptions and the need to estimate cardinality of an intermediate dataset Ca'.

In the prior art, a tool known as a query optimizer evaluates queries to determine whether an intermediate dataset exists or can be built that will more easily satisfy the query. In order to build an appropriate intermediate dataset, the query optimizer estimates cardinality of the intermediate dataset. Cardinality as used herein means the number of distinct values. Thus, the query optimizer needs to estimate the cardinality Ca' of T.A after applying local selection specified in the query in order to know how to best optimize the query, as shown in FIG. 4.

Figure 5:
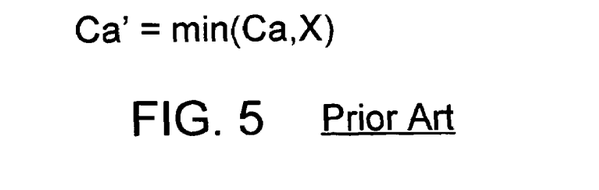
FIG. 5 shows a first prior art formula for estimating cardinality of the intermediate dataset.

In the prior art, one known way to estimate the cardinality Ca' uses the formula shown in FIG. 5, where X represents the number of rows selected. The cardinality Ca' is thus equal to the lesser of the cardinality of the database table Ca and the number of rows selected X. Thus, for a database table with 10,000 records and a cardinality Ca of 1,000, the cardinality of an intermediate dataset that includes 500 records is 500; the cardinality of an intermediate dataset that includes 800 records is 800; the cardinality of an intermediate dataset that includes 1000 records is 1000; and the cardinality of an intermediate dataset that includes 1200 records is 1000. In other words, the cardinality grows linearly with the number of selected rows up to a cap defined by the cardinality of the table. This assumption that cardinality grows in a linear fashion as more rows are selected is incorrect. The cardinality growth is probabilistic based on number of duplicates and number of rows selected. As a result, the simple computation of FIG. 5 may provide an estimate of cardinality that is grossly inaccurate. Join selectivity is inversely proportional to the cardinality estimates, so an inaccurate cardinality estimate using the prior art formula shown in FIG. 5 can result in problems in join orders and grouping. As a result, a prior art optimizer using the prior art formula in FIG. 5 for estimating cardinality may determine join orders and groupings that are less than optimal based on the inaccurate estimate. The degree to which the prior art cardinality estimate is inaccurate goes up if data skew is present. As a result, the prior art method that uses for formula in FIG. 5 to estimate cardinality of an intermediate dataset may produce a cardinality estimate that is not terribly useful because it is not very accurate, particularly when data skew is present.

Figure 6:
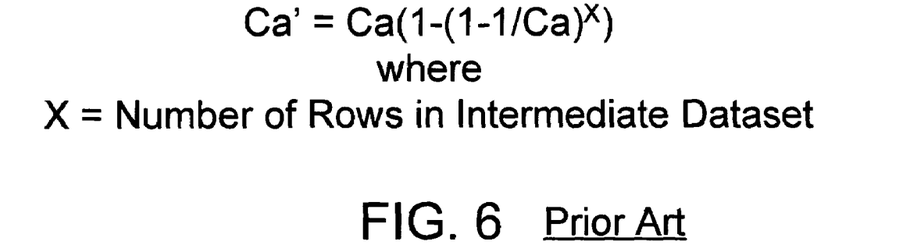
FIG. 6 shows a second prior art formula for estimating cardinality of the intermediate dataset.
Figure 7:
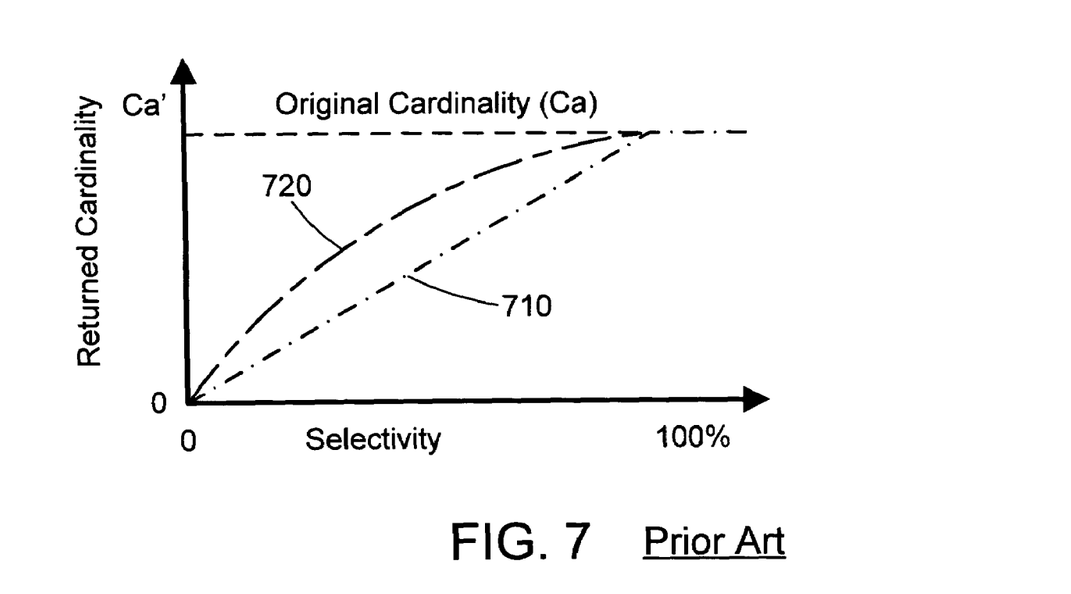
FIG. 7 is a graph showing the cardinality estimates provided by the equations in FIGS. 5 and 6.

A second formula that is known in the art is shown in FIG. 6. The formula in FIG. 6 improves on the linear assumption in the formula of FIG. 5 by providing a probabilistic estimate of cardinality. The improvement between the prior art linear cardinality estimate and the prior art probabilistic estimate is shown graphically in FIG. 7. The linear model is shown by line 710, while the probabilistic model is shown by curved line 720. The probabilistic estimation of cardinality shown by line 720 improves upon the linear estimate in line 710, but neither of lines 710 or 720 provide a good estimate when data skew is present.

Figure 8:
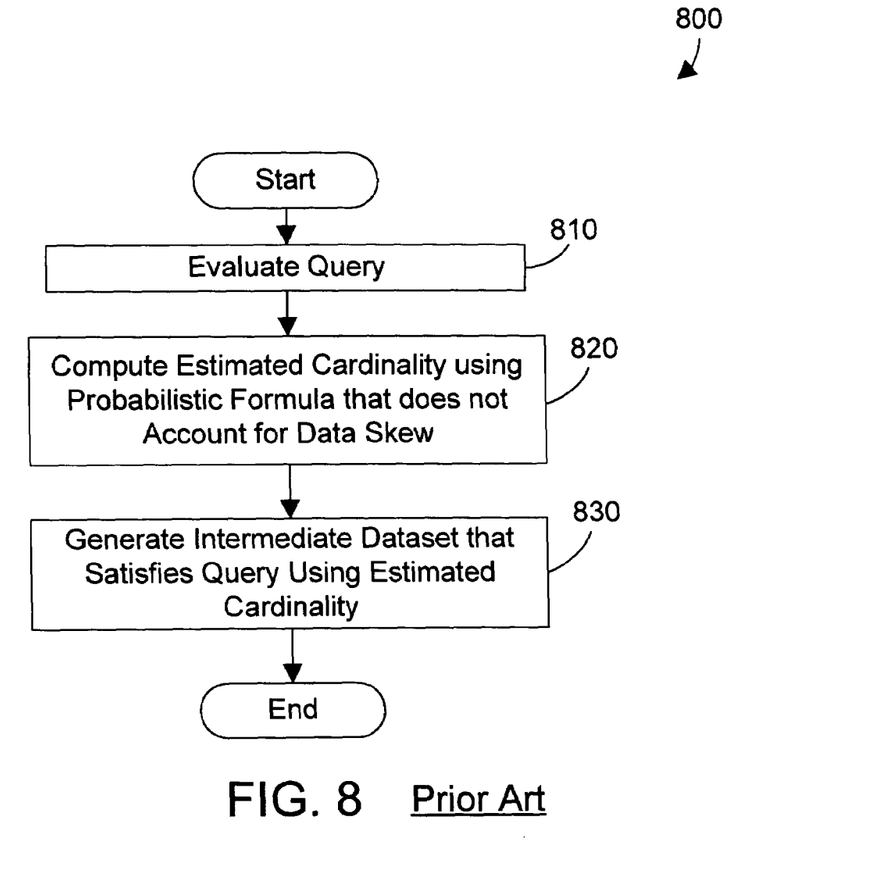
FIG. 8 is a flow diagram of a prior art method that includes estimating cardinality of an intermediate dataset.

FIG. 8 shows a prior art method 800 for optimizing a query using an estimate of cardinality of an intermediate dataset. First, the query is evaluated (step 810). The estimated cardinality is then computed using the probabilistic formula shown in FIG. 6, which assumes a uniform distribution in the data and does not account for data skew (step 820). Finally, the intermediate dataset that satisfies the query may be generated using the estimated cardinality (step 830). Prior art method 800 thus estimates cardinality in step 820 in a probabilistic manner that assumes uniform distribution of values in the intermediate dataset (i.e., no data skew). The preferred embodiments presented below provide an enhanced estimation of cardinality when data skew is present.

2.0 Description of the Preferred Embodiments

The present invention provides a new way to estimate cardinality of an intermediate dataset. The resulting cardinality estimate is much closer to the actual cardinality, especially when data skew is present. As a result, query optimizations based on the estimated cardinality will be better.

Figure 1:
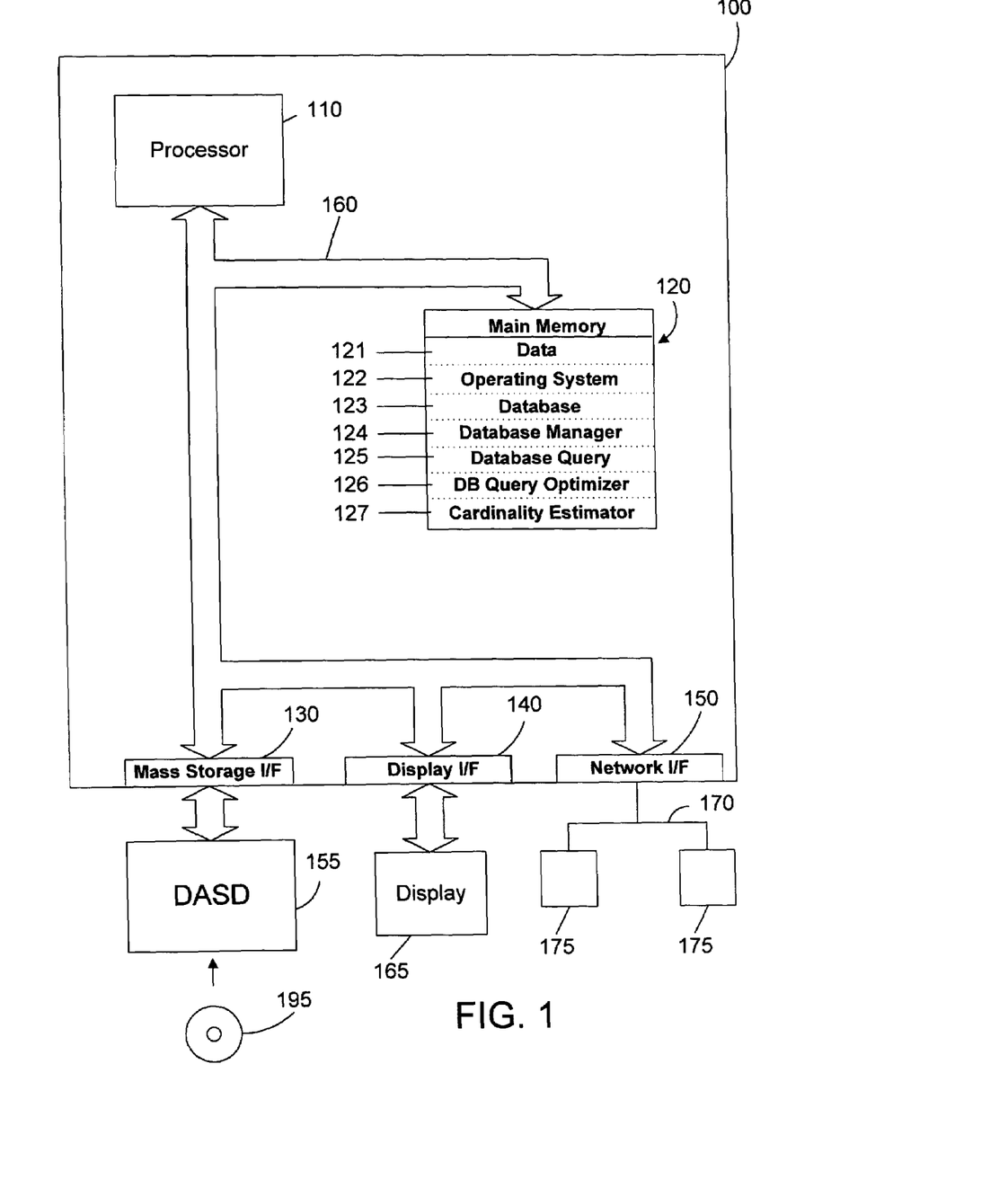
FIG. 1 is a block diagram of an apparatus in accordance with the preferred embodiments.

Referring to FIG. 1, a computer system 100 is one suitable implementation of an apparatus in accordance with the preferred embodiments of the invention. Computer system 100 is an IBM eServer iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD RW drive, which may store data to and read data from a CD RW 195.

Main memory 120 in accordance with the preferred embodiments contains data 121, an operating system 122, a database 123, a database manager 124, one or more database queries 125, a database query optimizer 126, and a cardinality estimator 127. Data 121 represents any data that serves as input to or output from any program in computer system 100. Operating system 122 is a multitasking operating system known in the industry as OS/400; however, those skilled in the art will appreciate that the spirit and scope of the present invention is not limited to any one operating system. Database 123 is any suitable database, whether currently known or developed in the future. Database manager 124 provides an interface to database 123, processing queries and returning the query results. Database query 125 is a query in a format compatible with the database 123 that allows information stored in the database 123 that satisfies the database query 125 to be retrieved. Database query optimizer 126 processes database query 125 to optimize database query 125. The cardinality estimator 127 estimates cardinality of an intermediate dataset for the database query 125 The database query optimizer 126 may use the cardinality estimate from the cardinality estimator 127 to optimize an intermediate dataset for database query 125. While cardinality estimator 127 is shown in FIG. 1 to be separate from the other items in main memory 120, it is also within the scope of the preferred embodiments to include the cardinality estimator as part of the database manager 124, as part of the database query optimizer 126, or as part of any other computer program.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, database 123, database manager 124, database query 125, database query optimizer 126, and cardinality estimator 127 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer-readable signal bearing media used to actually carry out the distribution. Examples of suitable computer-readable signal bearing media include: recordable type media such as floppy disks and CD RW (e.g., 195 of FIG. 1), and transmission type media such as digital and analog communications links.

Figure 9:
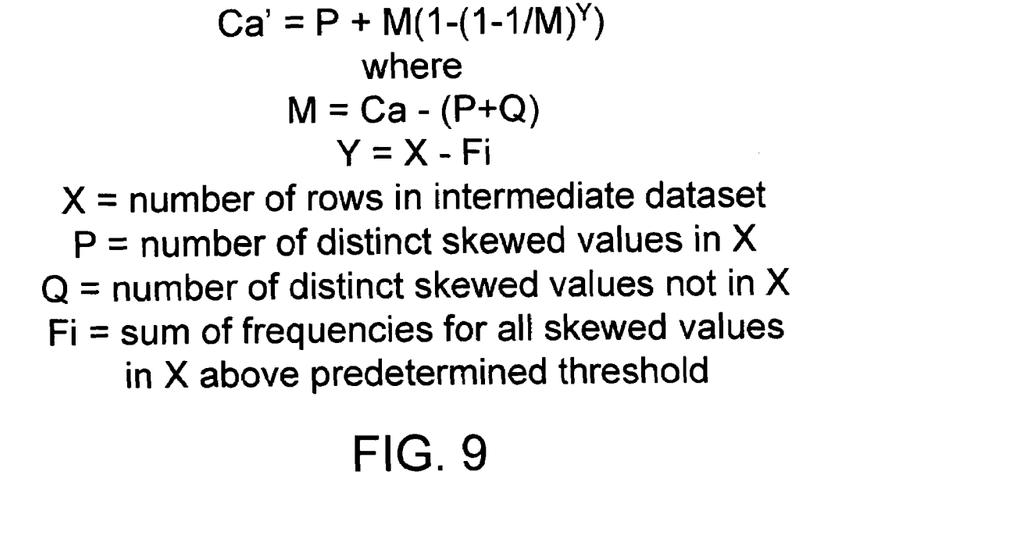
FIG. 9 shows a formula in accordance with the preferred embodiments for estimating cardinality of an intermediate dataset.

A formula that cardinality estimator 127 in FIG. 1 may use for estimating cardinality in accordance with the preferred embodiments is shown in FIG. 9. While this formula is similar in some respects to the formula in FIG. 6, the differences are significant. First of all, the exponent Y is computed by subtracting Fi, which is the sum of frequencies for all values above the predetermined threshold that satisfy the query, from X, the number of rows in the intermediate dataset. The exponent Y thus accounts for some of the effects of data skew. In addition, a value P represents the number of entries in the frequent values list above the predetermined threshold that satisfies the query. A value Q represents the number of entries in the frequent values list above the predetermined threshold that do not satisfy the query. The sum of P and Q is subtracted from the cardinality of the table Ca to arrive at a value M, which is a value that accounts for the data skew provided by the values corresponding to P and Q. In effect, the computation of Y and M reduce the effect of data skew, thereby producing an estimate for cardinality Ca' of the intermediate dataset that is much closer to the actual cardinality than either of the prior art formulae in FIGS. 5 and 6 when data skew is present.

Figure 10:
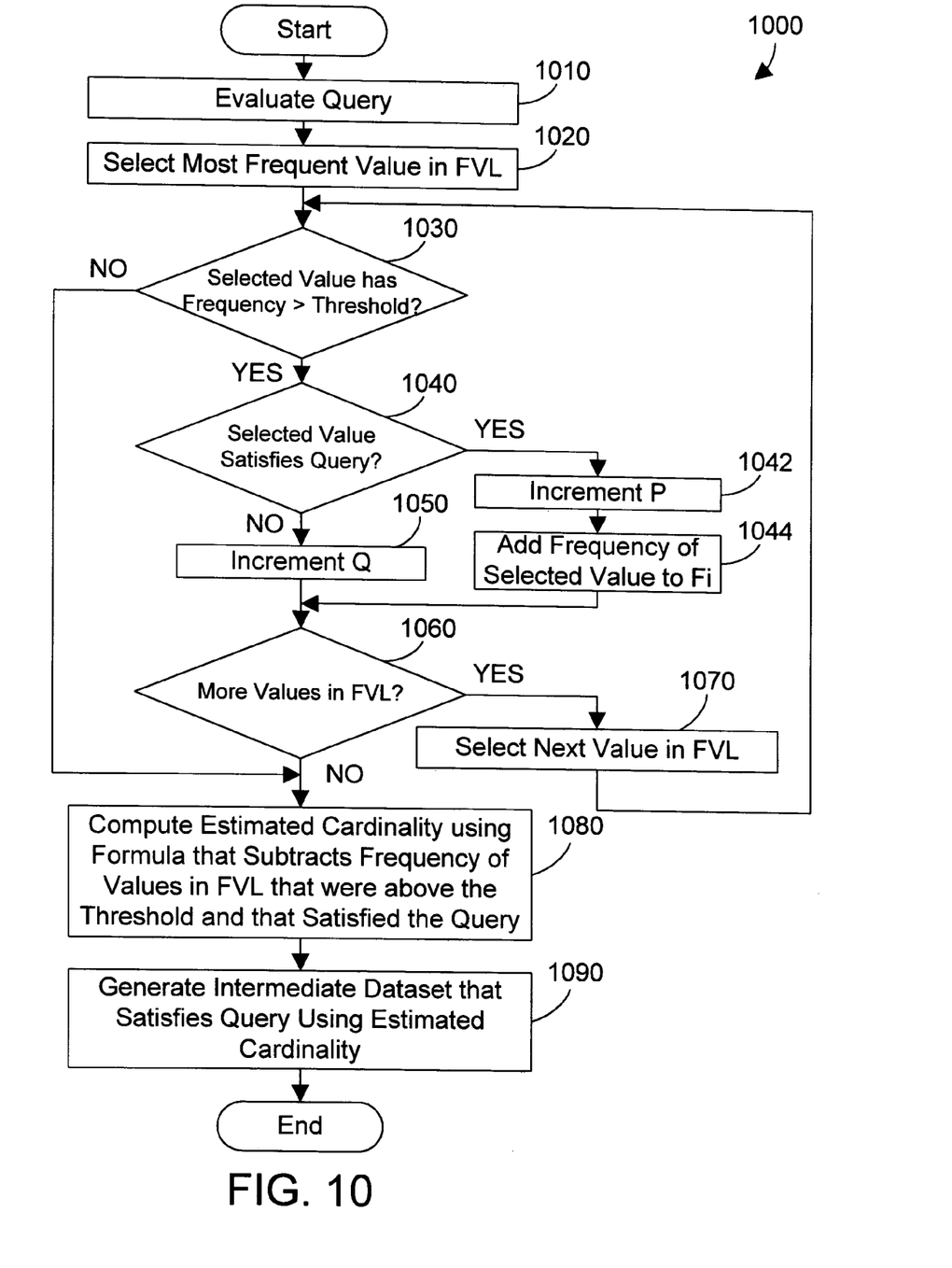
FIG. 10 is a flow diagram of a method in accordance with the preferred embodiments that includes estimating cardinality of an intermediate dataset.

Referring now to FIG. 10, a method 1000 in accordance with the preferred embodiments starts by evaluating a query (step 1010). Method 1000 assumes a Frequent Values List exists for the column of interest, with the values arranged in descending numerical order, with the value with the highest frequency first, the value with the second highest frequency second, and so on to the last value in the frequent values list that has the lowest frequency in the list. The most frequent value in the frequent values list is selected (step 1020). The selected value is then compared with a predetermined threshold (step 1030). The predetermined threshold determines which values in the frequent value list cause data skew. Values above the predetermined threshold are accounted for individually, while the values below the predetermined threshold are accounted for using a probabilistic calculation. The predetermined threshold may be selected or derived in any suitable manner within the scope of the preferred embodiments. In one very simple implementation, the predetermined threshold is set to twice the frequency of all rows in the database, which is computed by dividing the total number of records by the cardinality of the column of interest. For example, for the simple example shown in FIG. 12 that has 1,000,000 total records and a cardinality of 100,000, the frequency of all rows in the database is 1,000,000/100,000 or 10. Thus, the predetermined threshold could be set to a value of 20, which is twice the average frequency for the entire database. Any value in the frequent values table that has a frequency greater than 20 would be accounted for individually, while all values in the frequent values table that have a frequency of 20 or less are accounted for using a probabilistic formula. Of course, other formulae or heuristics may be used to derive or generate a suitable threshold in accordance with the preferred embodiments. The present invention provides a more accurate estimate for cardinality based on individually accounting for values in a frequent values table that have a frequency greater than the predetermined threshold, while using a probabilistic approach to account for all values that fall below the predetermined threshold.

If the selected value exceeds the predetermined threshold (step 1030=YES), and if the selected value satisfies the query (step 1040=YES), the value of P is incremented (step 1042), and the frequency of the selected value is added to Fi. In the formula of FIG. 9, the values of P, Q and Fi are initialized to zero when method 1000 starts. If the selected value does not satisfy the query (step 1040=NO), the value of Q is incremented (step 1050). If there are more values in the frequent value list (step 1060=YES), the next value in the frequent values list is selected (step 1070). Method 1000 then loops back to step 1030 and continues. If the newly selected value has a frequency that exceeds the predetermined threshold (step 1030=YES) and satisfies the query (step 1040=YES), the value for P is incremented by one (step 1042) and the frequency of the selected value is added to Fi (step 1044). This process continues until there are no more values in the frequent values list (step 1060=NO), or until the selected value has a frequency that is equal to or less than the predetermined threshold (step 1030=NO). At this point, the cardinality is computed using the probabilistic formula in FIG. 9 (step 1080), which makes allowances for the data skew by subtracting the frequency of values in the frequent values list that were above the threshold and that satisfied the query, and by adding P to the cardinality estimate to individually account for all values above the predetermined threshold in the frequent values list that satisfy the query. The intermediate dataset may then be generated using the estimated cardinality (step 1090). Because the cardinality estimate of the preferred embodiments is a better estimate when data skew is present, the generation of the intermediate dataset in step 1090 may be done in a more efficient manner.

Note that method 1000 in FIG. 10 is shown as an example of one suitable method in accordance with the preferred embodiments. Note that the logical operators that operate on the threshold value may be any suitable operator, and the threshold may be any suitable value. Thus, while step 1030 in FIG. 10 shows taking the YES branch if the selected value has a frequency greater than the threshold, this comparison could instead take the YES branch if the selected value has a frequency greater than or equal to the threshold. One of ordinary skill in the art will recognize that any combination of threshold value and logical operators for comparing the selected value against the threshold value are within the scope of the preferred embodiments and claims herein.

Figure 11:
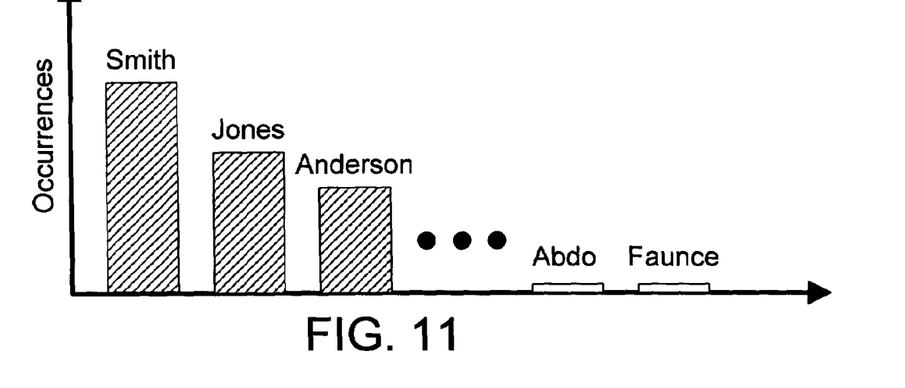
FIG. 11 is a histogram showing occurrences of different last names in a sample database table.
Figure 12:
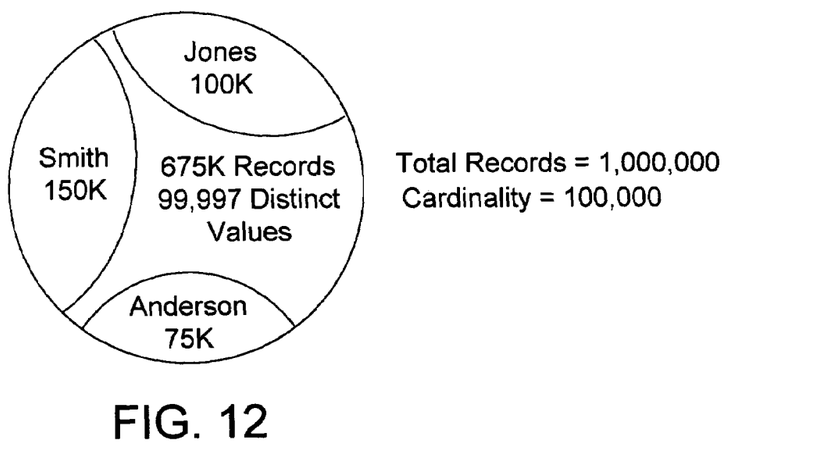
FIG. 12 is a diagram that graphically shows how data skew shown in FIG. 11 negatively affects the quality of the prior art cardinality estimate.

We now present a simple example that illustrates the concepts of the preferred embodiments. We assume that a database has a table T that contains records with a last name field in its first column T.A. Last names in a table provide an excellent example of data that is skewed. There are many people that share common last names, while there are also many that may have unique last names in the database. Referring to the histogram of FIG. 11, we assume that the name Smith is the most frequent in the database, followed by the name Jones and the name Anderson. We assume there may also be any number of names with corresponding frequencies in the database, with the names that have the lowest frequency having only a single occurrence in the database. The graph of FIG. 12 shows the assumed numerical distribution of name frequencies. A total of 1,000,000 records are in the database, with a cardinality of 100,000 for the last name column T.A. If the date were evenly distributed, each value in the database would have 10 records. But in this example that uses last names, we assume the name Smith has a frequency of 150,000 in the database, the name Jones has a frequency of 100,000 in the database, and the name Anderson has a frequency of 75,000 in the database. This is a clear case of data skew, where the three most frequent values make up nearly a third of the frequencies in the database. The remaining 675,000 records include 99,997 distinct values, since there are three frequently used values that each have a cardinality of one. As a result, the average number of records per distinct value in the non-frequent values is 675,000/99,997, or 6.75 records for each distinct value. We can therefore tell by a simple inspection of the graph in FIG. 12 that data skew causes the prior art cardinality estimate to be less accurate.

Figure 13:
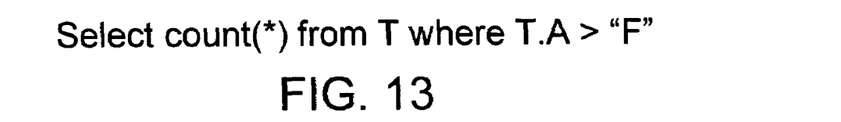
FIG. 13 shows a query that may be run against the last name column in a database table that has the attributes in FIGS. 11 and 12.

We assume the query in FIG. 13 is used. The "where" clause specifies to add to the count when the last name in column T.A is greater than the letter "F", meaning that the last name starts with a letter in the alphabet that comes after F. A frequent values list for the database shown in FIG. 12 is shown as 1400 in FIG. 14. Without delving into specifics, we assume that a predetermined threshold 1410 is set to a level that causes the most frequent values Smith, Jones and Anderson to lie above the predetermined threshold 1410, will all other values in the frequent values list lying below the predetermined threshold 1410, as shown in FIG. 14.

Figure 14:
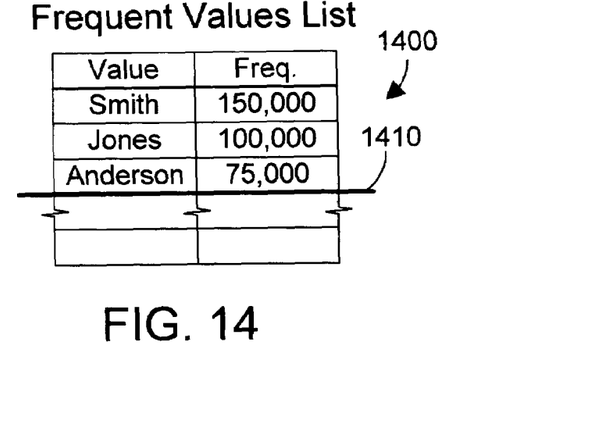
FIG. 14 shows a frequent values list for the example in FIGS. 11–13.
Figure 15:
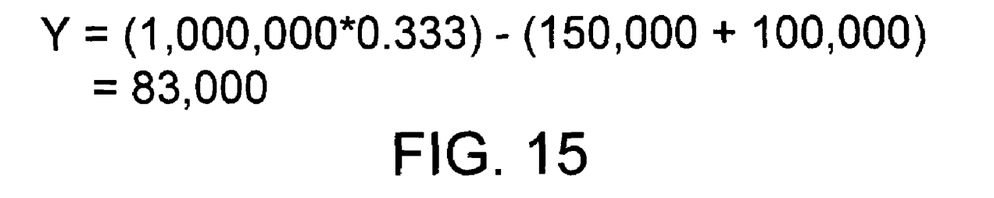
FIG. 15 shows the calculation of Y in the formula in FIG. 9 using values shown in the example in FIGS. 11–14.

Now we apply method 1000 in FIG. 10 to the example in FIGS. 11-14. Recall that when method 1000 begins, the values of P, Q and Fi are initialized to zero. The query in FIG. 13 is evaluated in step 1010, and it is determined from the "where" clause that the last name column T.A is the column of interest for this query. The most frequent value is then selected from the frequent values list in step 1020, which results in the value of Smith being selected. We assume a threshold of 20 for this example. Because the frequency of Smith is 150,000, which exceeds the threshold of 20, step 1030=YES. Because the value of Smith satisfies the query because the letter S comes after the letter F in the alphabet, step 1040=YES. As a result, the value of P is incremented from zero to one in step 1042, and the frequency for Smith, namely 150,000, is added to Fi (which was initialized to zero), resulting in Fi=150,000. There are more values in the frequent values list (step 1060=YES), so the next value is selected (step 1070). The next value is Jones, as shown in FIG. 14. Because the frequency of Jones is 100,000, which exceeds the threshold of 20, step 1030=YES. Because the selected value of Jones satisfies the query because the letter J comes after the letter F in the alphabet, step 1040=YES. As a result, the value of P is incremented from one to two in step 1042 and the frequency of Jones, namely 100,000, is added to Fi, which is 150,000, for a total of 250,000. There are still more values in the frequent values list (step 1060=YES), so the next value of Anderson is selected (step 1070). Because the frequency of Anderson is 75,000, which exceeds the threshold of 20, step 1030=YES. Note, however, that the value Anderson does not satisfy the query because the letter A comes before the letter F. As a result, step 1040=NO, and the value of Q is incremented from zero to one (step 1050). There are more values in the frequent values list (step 1060=YES), so the next value is selected in step 1070. At this point, we assume the next value has a frequency that lies below the predetermined threshold (step 1030=NO), as shown in FIG. 14. The cardinality of the intermediate dataset may then be computed using the formula in FIG. 9 (step 1080). At this point, P=2, Q=1 and Fi=250,000. First, the value of Y is computed as shown in FIG. 15. The value of Ca is the original number of rows in the database, which is 1,000,000 for this specific example, and we assume a selectivity of 0.333, resulting in an estimated number of rows 333,000 in the intermediate dataset. The value of Fi, which is 250,000, is then subtracted from 333,000. As a result, the value of Y is computed as shown in FIG. 15, with the result being Y=83,000.

Figure 16:
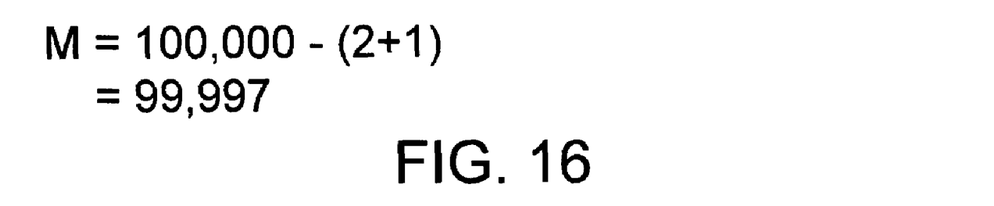
FIG. 16 shows the calculation of M in the formula in FIG. 9 using values shown in the example in FIGS. 11–14.
Figure 17:
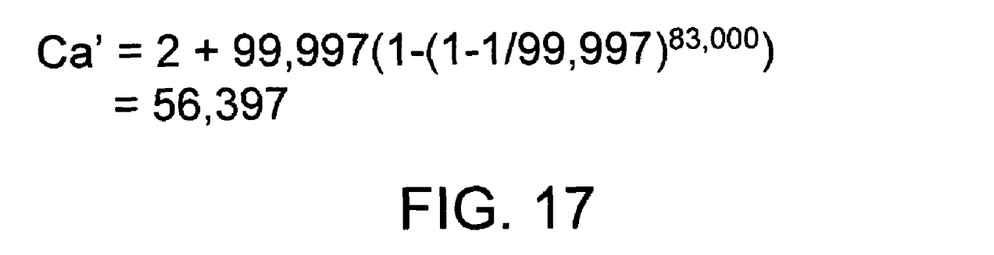
FIG. 17 shows the calculation of estimated cardinality Ca' in the formula in FIG. 9 using values shown in the example in FIGS. 11–14.

Next, the value of M is computed as shown in FIG. 16, with Ca=100,000, P=2 and Q=1 to arrive at M=99,997. Now we can compute the estimated cardinality Ca' of the intermediate dataset using the formula in FIG. 9, as shown in FIG. 17, which gives a result Ca'=56,397. Once the estimated cardinality is computed in step 1080, the intermediate dataset may then be generated using the estimated cardinality (step 1090).

Figure 18:
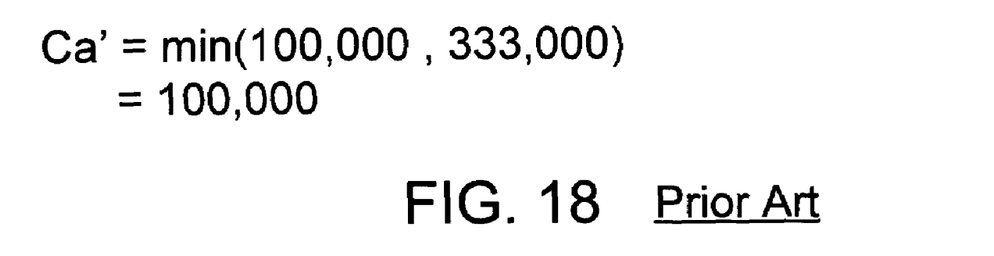
FIG. 18 shows the calculation of estimated cardinality Ca' in the prior art formula in FIG. 5 using values shown in the example in FIGS. 11–14.
Figure 19:
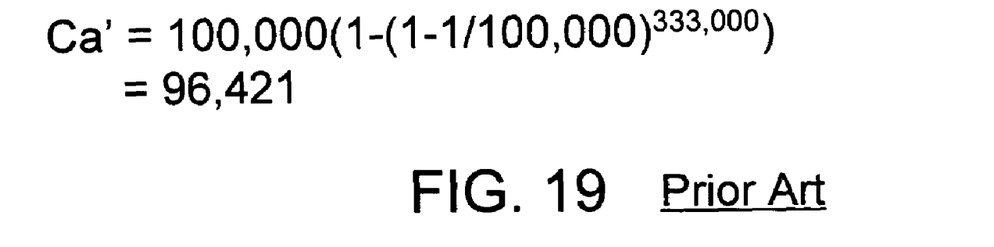
FIG. 19 shows the calculation of estimated cardinality Ca' in the prior art formula in FIG. 6 using values shown in the example in FIGS. 11–14.

We now show the improvement using the apparatus and methods of the preferred embodiments when compared to prior art techniques for estimating cardinality of an intermediate dataset. FIG. 18 shows the prior art formula of FIG. 5 with the values in the example in FIGS. 11–14, which results in a computed cardinality Ca' of 100,000. FIG. 19 shows the prior art formula of FIG. 6 with the values in the example in FIGS. 11–14, which results in a computed cardinality Ca' of 96,421. Because of the data skew caused by the three values Smith, Jones and Anderson in this example, the prior art cardinality estimate of 96,421 is higher than the cardinality estimate of the preferred embodiments of 56,397, because the formula used for the preferred embodiments reduces the effect of data skew on the estimated cardinality. We assume the cardinality of the intermediate dataset is 67,500 based on the distribution shown in FIG. 12. Because the cardinality estimate of 56,397 of the preferred embodiments is closer to 67,500 than the cardinality estimate of 96,421 or 100,000 using the prior art techniques, the cardinality estimate of the preferred embodiments will provide better optimizations of the query.

The example in FIGS. 11–17 is somewhat contrived and extremely simplified for illustrating the concepts of the preferred embodiments. In reality, a database table that includes 1,000,000 records that include a last name field will have a relatively large number of last names that have more than 20 records. As a result, the data skew in an actual database table would likely be much greater than shown in this simple example.

By accounting for data skew, the apparatus and method of the preferred embodiments for estimating cardinality yields a cardinality estimate that is much closer to the actual cardinality in the intermediate dataset. With a better cardinality estimate, the optimizer may make better decisions about how to construct the intermediate dataset to optimize the processing of a query.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. An apparatus comprising:
   at least one processor;
   a memory coupled to the at least one processor;
   a database table residing in the memory;
   a cardinality estimator residing in the memory and executed by the at least one processor, the cardinality estimator estimating cardinality of an intermediate dataset that satisfies a query to the database table in a manner that accounts for data skew in the database table;
   a query optimizer residing in the memory that uses the estimated cardinality from the cardinality estimator to optimize the query; and
   a frequent values list residing in the memory that contains a list of values in the database table, each value having a corresponding frequency, wherein the cardinality estimator estimates the cardinality of the intermediate dataset by determining whether a frequency corresponding to a value exceeds a predetermined threshold, and if the frequency exceeds the predetermined threshold, accounting for the corresponding value, and if the frequency does not exceed the predetermined threshold, using a formula to estimate the cardinality of the intermediate dataset, the formula accounting for data skew in the database table by subtracting the frequency of all values above the predetermined threshold in the frequent values list that satisfy the query from the total number of rows in the intermediate dataset.

2. The apparatus of claim 1 wherein the cardinality estimator estimates the cardinality Ca' of the intermediate dataset using the formula:

$$Ca' = P + M\left(1 - \left(1 - \frac{1}{M}\right)^Y\right)$$

where
   M=Ca−(P+Q)

P=number of distinct values in the frequent values list above the predetermined threshold that satisfy the query;

Q=number of distinct values in the frequent values list above the predetermined threshold that do not satisfy the query;

Ca=cardinality of the database table;

Y=X−Fi;

X=number of rows in the intermediate dataset; and

Fi=sum of frequencies of values in the frequent values list above the predetermined threshold that satisfy the query.

3. An apparatus comprising:

at least one processor;

a memory coupled to the at least one processor;

a database table residing in the memory;

a frequent values list residing in the memory that contains a list of values in the database table, each value having a corresponding frequency; and a cardinality estimator residing in the memory and executed by the at least one processor, the cardinality estimator estimating cardinality of an intermediate dataset for a query to the database table using the following formula:

$$Ca' = P + M\left(1 - \left(1 - \frac{1}{M}\right)^Y\right)$$

where

M=Ca−(P×Q)

P=number of distinct values in the frequent values list above a predetermined threshold that satisfy the query;

Q=number of distinct values in the frequent values list above the predetermined threshold that do not satisfy the query;

Ca=cardinality of the database table;

Y=X−Fi;

X=number of rows in the intermediate dataset; and

Fi=sum of frequencies of values in the frequent values list above the predetermined threshold that satisfy the query; and a query optimizer residing in the memory that uses the estimated cardinality of the intermediate dataset to optimize the query.

4. A method for optimizing a query to a database table by estimating cardinality of an intermediate dataset that results from processing the query, the method comprising the steps of:

(A) evaluating the query;

(B) estimating cardinality of the intermediate dataset using a formula that accounts for data skew in the database table by performing the steps of:

selecting a value in a frequent values list that contains a list of values in the database table, each value having a corresponding frequency;

if the selected value has a corresponding frequency that exceeds a predetermined threshold, incrementing the cardinality estimate by one; and if the frequency does not exceed the predetermined threshold, using a formula to estimate the cardinality of the intermediate dataset, the formula accounting for data skew in the database table by subtracting the frequency of all values above the predetermined threshold in the frequent value table that satisfy the query from the total number of rows in the intermediate dataset: and (C) using the cardinality estimate in step (B) to optimize the query.

5. The method of claim 4 wherein the cardinality estimator estimates the step of estimating the cardinality Ca' of the intermediate dataset in step (B) uses the formula:

$$Ca' = P + M\left(1 - \left(1 - \frac{1}{M}\right)^Y\right)$$

where

M=Ca−(P×Q)

P=number of distinct values in the frequent values list above the predetermined threshold that satisfy the query;

Q=number of distinct values in the frequent values list above the predetermined threshold that do not satisfy the query;

Ca=cardinality of the database table;

Y=X−Fi;

X=number of rows in the intermediate dataset; and

Fi=sum of frequencies of values in the frequent values list above the predetermined threshold that satisfy the query.

6. A method for optimizing a query to a database table by estimating cardinality of an intermediate dataset that results from processing the query on a database table, the method comprising the steps of:

(A) evaluating the query;

(B) estimating the cardinality Ca' of the intermediate dataset using the formula:

$$Ca' = P + M\left(1 - \left(1 - \frac{1}{M}\right)^Y\right)$$

where

M=Ca−(P×Q)

P=number of distinct values in the frequent values list above a predetermined threshold that satisfy the query;

Q=number of distinct values in the frequent values list above the predetermined threshold that do not satisfy the query;

Ca=cardinality of the database table;

Y=X−Fi;

X=number of rows in the intermediate dataset; and

Fi=sum of frequencies of values in the frequent values list above the predetermined threshold that satisfy the query; and (C) using the cardinality estimate in step (B) to optimize the query.

7. A computer-readable program product comprising:

(A) cardinality estimator estimating cardinality of an intermediate dataset that satisfies a query to a database table in a manner that accounts for data skew in the database table, wherein the cardinality estimator evaluates a frequent values list that contains a list of values in the database table, each value having a corresponding frequency, wherein the cardinality estimator estimates the cardinality of the intermediate dataset by determining whether a frequency corresponding to a value exceeds a predetermined threshold, and if the frequency exceeds the predetermined threshold, accounting for the corresponding value, and if the frequency does not exceed the predetermined threshold, using a formula to estimate the cardinality of the intermediate dataset, the formula accounting for data skew in the database table by subtracting the frequency of all values above the predetermined threshold in the frequent values list that satisfy the query from the total number of rows in the intermediate dataset;

(B) a query optimizer that uses the estimated cardinality from the cardinality estimator to optimize the query; and (C) recordable media bearing the cardinality estimator and the query optimizer.

8. The program product of claim 7 wherein the cardinality estimator estimates the cardinality Ca' of the intermediate dataset using the formula:

$$Ca' = P + M\left(1 - \left(1 - \frac{1}{M}\right)^Y\right)$$

where
- M=Ca−(P×Q)
- P=number of distinct values in the frequent values list above the predetermined threshold that satisfy the query;
- Q=number of distinct values in the frequent values list above the predetermined threshold that do not satisfy the query;
- Ca=cardinality of the database table;
- Y=X−Fi;
- X=number of rows in the intermediate dataset; and
- Fi=sum of frequencies of values in the frequent values list above the predetermined threshold that satisfy the query.

9. A computer-readable program product comprising:
(A) a cardinality estimator that estimates cardinality of an intermediate dataset for a query to a database table using the following formula:

$$Ca' = P + M\left(1 - \left(1 - \frac{1}{M}\right)^Y\right)$$

where
- M=Ca−(P×Q)
- P=number of distinct values in a frequent values list above a predetermined threshold that satisfy the query;
- Q=number of distinct values in the frequent values list above the predetermined threshold that do not satisfy the query;
- Ca=cardinality of the database table;
- Y=X−Fi;
- X=number of rows in the intermediate dataset; and
- Fi=sum of frequencies of values in the frequent values list above the predetermined threshold that satisfy the query;

(B) a query optimizer that uses the estimated cardinality from the cardinality estimator to optimize the query; and (C) recordable media bearing the cardinality estimator and the query optimizer.

* * * * *